United States Patent [19]

Tokuoka et al.

[11] 3,953,656

[45] Apr. 27, 1976

[54] MAGNETIC RECORDING MEDIUM AND PREPARATION THEREOF

[75] Inventors: Yasumichi Tokuoka; Shinji Umeki; Yuichi Kubota, all of Tokyo, Japan

[73] Assignee: TDK Electronic Company, Tokyo, Japan

[22] Filed: Feb. 28, 1974

[21] Appl. No.: 446,740

[30] Foreign Application Priority Data

Mar. 20, 1973 Japan.............................. 48-31487

[52] U.S. Cl.............................. 428/539; 428/900
[51] Int. Cl.² ...................................... H01F 10/02
[58] Field of Search .......... 117/235–240; 252/62.54; 428/539, 900

[56] References Cited
UNITED STATES PATENTS

| | | | |
|---|---|---|---|
| 3,374,113 | 3/1968 | Chang et al................. | 117/238 UX |
| 3,490,945 | 1/1970 | Slovinsky...................... | 117/238 X |
| 3,573,980 | 4/1971 | Haller et al..................... | 117/238 |
| 3,627,580 | 12/1971 | Krall................................. | 117/238 |
| 3,740,266 | 6/1973 | Akashi et al.................. | 117/235 X |
| 3,814,672 | 6/1974 | Kitamoto et al............... | 117/238 X |
| 3,824,128 | 7/1974 | Akashi et al.................. | 117/239 X |

Primary Examiner—Bernard D. Pianalto
Attorney, Agent, or Firm—Oblon, Fisher, Spivak, McClelland & Maier

[57] ABSTRACT

The magnetic recording medium having a magnetic recording layer containing magnetic iron oxide having a cobalt content of 0.5 – 10 wt.% and a ratio of $Fe^{2+}/Fe^{3+}$ of 0.1 – 0.35; wherein the half-value width of the differential curve of the residual magnetization curve is less than 60% of the half-value width of the differential curve of the residual magnetization curve of non-treated magnetic recording layer.

1 Claim, 5 Drawing Figures

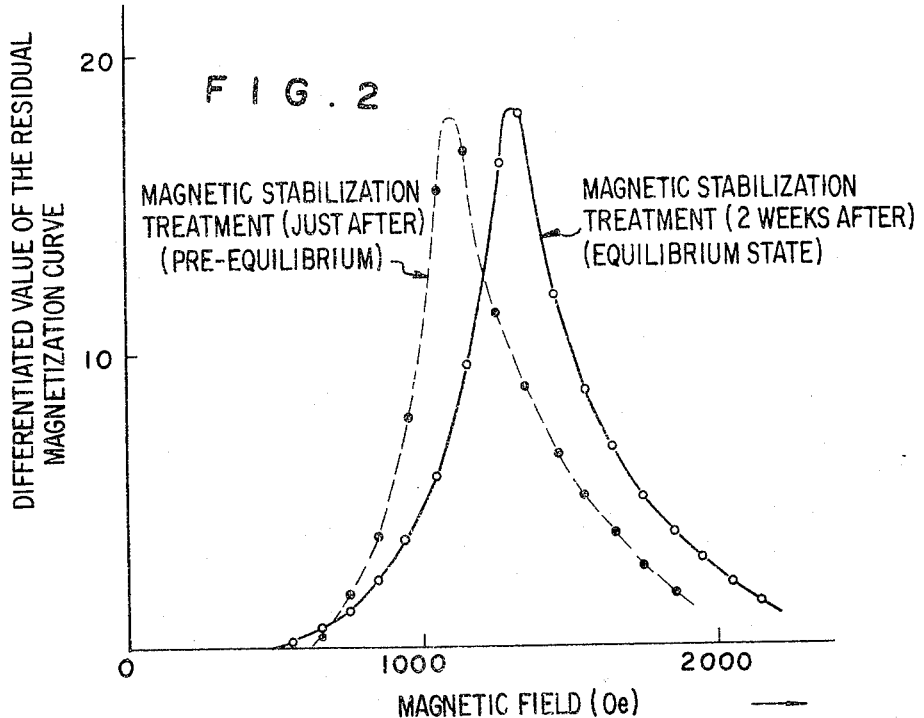
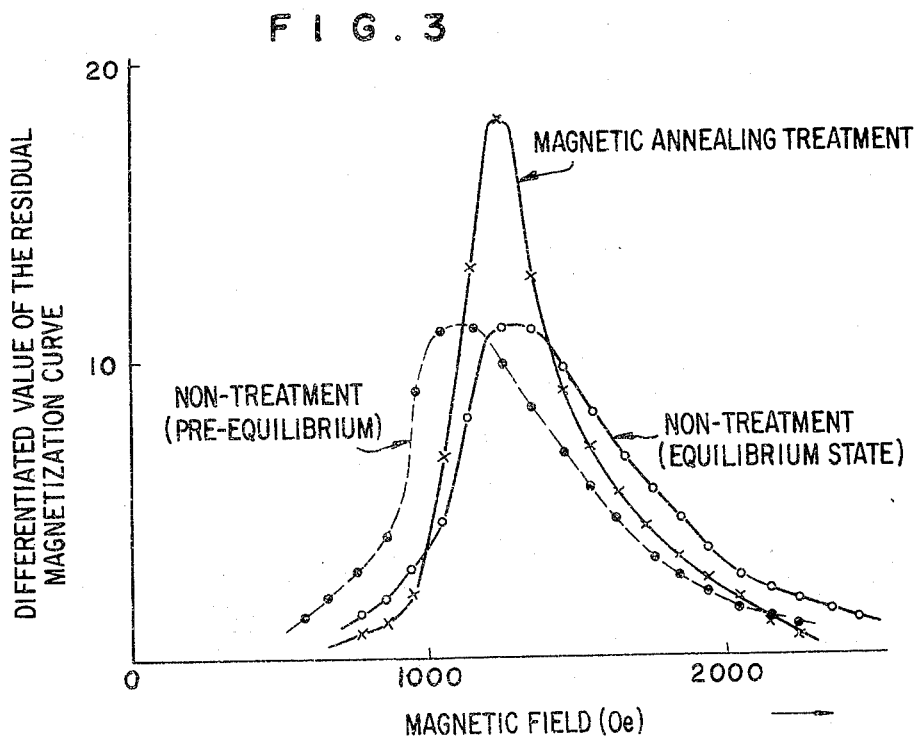

MAGNETIC RECORDING MEDIUM AND PREPARATION THEREOF

BACKGROUND OF THE INVENTION

1. Field of the Invention

This invention relates to a magnetic recording medium and the preparation thereof.

2. Description of the Prior Art

When iron-cobalt ferrites have many sites of cation vacancy, uniaxial induced magnetic anisotropy of the ferrites rather easily develops. Moreover, magnetic annealing treatment for this anisotropy has also been found. This phenomenon is believed to be caused by the diffusion of $Co^{2+}$ ion, which results in the location of cobalt ion sites in proximity to the direction of the applied magnetic field in the spinel B sites as a result of the magnetic annealing effect. By this treatment, substances having high uniaxial induced magnetic anisotropy in the direction of the applied magnetic field have been prepared. It has been proposed to prepare magnetic tapes having improved squareness in the longtudinal direction of the tapes by application of the magnetic annealing treatment utilizing induced magnetic anisotropy.

However, the magnetic annealing treatment is only effective for the improvement of magnetic characteristics of magnetic tapes. On the other hand, the tapes treated by magnetic annealing have the disadvantage of having magnetic instability called relaxation phenomenon. Moreover, it is difficult in the mass production of magnetic tapes to generate a uniform magnetic field having a temperature gradient which can be used to effect the magnetic annealing treatment.

Among the disadvantages the relaxation phenomenon has appeared to result in the loss of improved magnetic characteristics of the magnetic tape because of the gradual decrease of the uniaxial anisotropy induced in the longitudinal direction of the tape by the magnetic annealing. The reason for this is that the thermal distribution of $Co^{2+}$ ions at high temperature is fixed by an external magnetic field in the magnetic annealing treatment. However, if an external magnetic field is removed after the magnetic annealing treatment the thermal distribution of $Co^{2+}$ ions changes to the original random distribution by thermal disturbance at room temperature. Thus, if the $Co^{2+}$ ion sites can be fixed not to move at room temperature after the magnetic treatment, the induced anisotropy can be stabilized. In this regard, it has been proposed to stabilize the induced anisotropy by removing the cation vacancies of the substance after the magnetic annealing treatment. However, it is impossible to completely fix the $Co^{2+}$ ions without completely removing the cation vacancies and even though the relaxation velocity can be decreased, gradual aging over long periods of time cannot be prevented by the oxidation of the substances. Moreover, the induced anisotropy may decrease by moving the $Co^{2+}$ ions by removing cation vacancies. As a matter of fact, when all cation vacancies are removed, the induced anisotropy also disappears. Thus, the method of stabilization by removing cation vacancies may not solve the problem of the relaxation phenomenon.

There have also been disadvantages with the apparatus used in the magnetic annealing in the mass production of magnetic tapes. In the practical operation for magnetic annealing the tapes in the form of rolls prior to slitting, have to be maintained uniformly in the condition of magnetic saturation along the longitudinal direction from high temperature to low temperature (room temperature).

For this purpose, it is necessary to use a long solenoid having a large diameter which generates magnetic fields greater than 2000 Oe. Such devices for practical purposes have been difficult to construct. A need therefore, exists for a magnetic recording medium which has a high magnetic stability and high tape sensitivity, utilizing induced magnetic anisotropy.

SUMMARY OF THE INVENTION

Accordingly, one object of the invention is to overcome the disadvantages of the conventional technology relating to magnetic recording media. Another object of the invention is to provide a magnetic recording medium utilizing induced magnetic anisotropy which has a high magnetic stability and high tape sensitivity and is easily prepared.

Briefly, these objects and other objects of the invention as hereinafter will become more readily apparent can be attained by providing a magnetic recording medium which has a magnetic recording layer containing an acicular magnetic iron oxide powder having a cobalt content of 0.5 – 10 wt% and a ratio of $Fe^{2+}/Fe^{3+}$ of 0.1 – 0.35 and treated to be magnetized so that a residual magnetization is retained which is at least 85% of the saturated magnetization and is stabilized at a temperature of room temperature to 60°C, wherein the half-value width of the differential curve of the residual magnetization curve is less than 60% of the half-value width of the differential curve of the non-treated conventional magnetic recording layer containing iron-cobalt magnetic oxide.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein

FIG. 2 shows the differential curve of the residual magnetization curve of a magnetic tape of one example of the invention;

FIG. 3 shows the differential curve of the residual magnetization curve of a conventional magnetic tape;

DETAILED DESCRIPTION OF PREFERRED EMBODIMENTS

One important aspect of this invention is the stabilization of the induced magnetic anisotropy of the powder by solving the problem of the magnetic annealing treatment through the utilization of being a single domain powder and of the characteristics of cation vacancy of the powder. From the viewpoint of mass production of magnetic recording media the induced magnetic anisotropy can be effectively utilized by an instantaneous magnetizing operation without the use of the conventional magnetic annealing treatment.

The stability of the induced magnetic anisotropy of the magnetic recording media is believed to occur because the $Co^{2+}$ containing fine ferrite powder are acicular single domain powder, and the $Co^{2+}$ ions are always exposed to the spontaneous magnetic field along the easy axis of the single domain powder, so that the $Co^{2+}$ ions move to certain equilibrium sites and stabilize under the influence of the magnetic field.

In the acicular, $Co^{2+}$ containing fine magnetite powder having an $Fe^{2+}/Fe^{3+}$ ratio of 0.10 – 0.35, much cation vacancies are easily formed so that the $Co^{2+}$ ions can easily move through the interaction between the $Co^{2+}$ ion and the cation vacancies. Accordingly, the $Co^{2+}$ ions move to the stable sites by the spontaneous magnetization of the powder and are fixed at certain equilibrium states at room temperature, then strong uniaxial induced magnetic anisotropy is produced to the direction of the spontaneous magnetization of the powder. The equilibrium states attained can not be destroyed by the conventional alternating current demagnetization at room temperature. Thus, the equilibrium states are quite stable.

Figure 1:
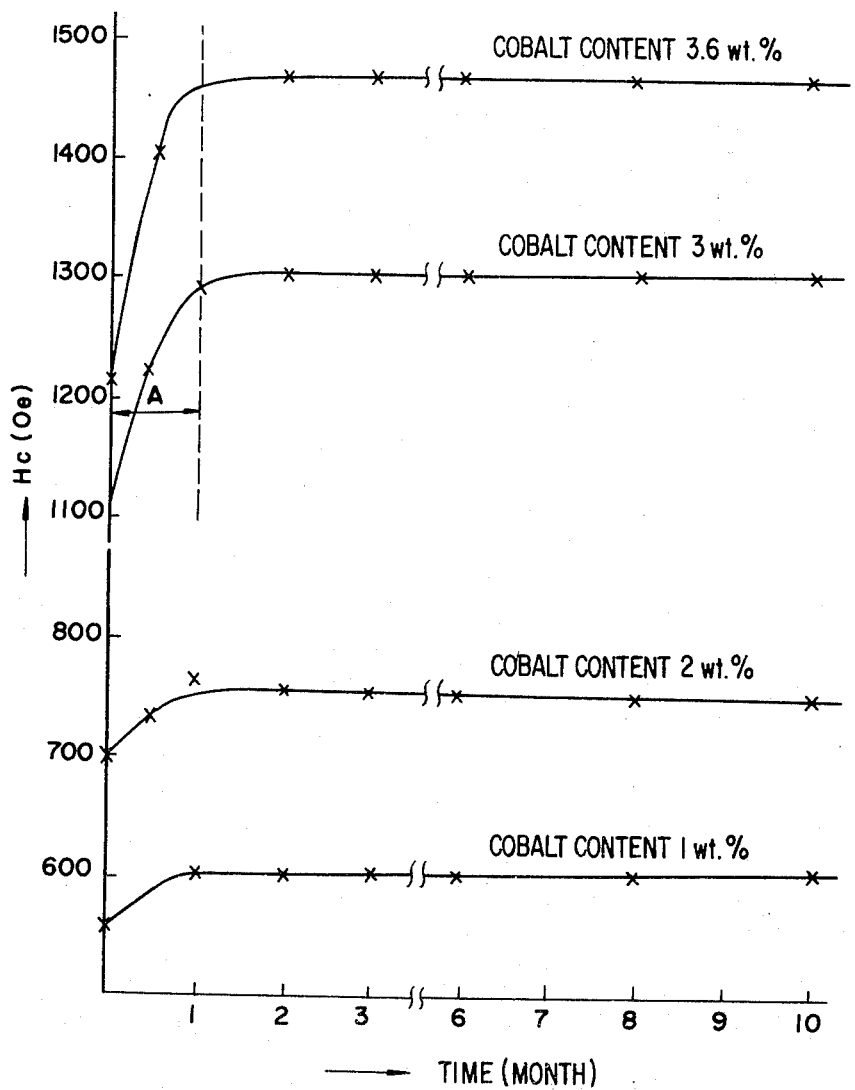
FIG. 1 shows the effect of aging on the coercive force Hc of a magnetic tape.

The process of the formation of the induced magnetic anisotropy by moving of the $Co^{2+}$ ions until the equilibrium states establish can be ascertained by reference to FIG. 1 in which it is shown that a steady coercive force Hc is attained and maintained after an initial period (period embraced by A) in which the coercive force rapidly increases. Thus, it is clear that the coercive force is very stable after the steady coercive force is achieved at room temperature.

In this case, as the particle is acicular single domain particle, the easy axis of spontaneous magnetization is thought to be near the long axis of the particles, so uniaxial induced anisotropy is produced along the same direction of the long axis of the powder. Thus, if this anisotropy is formed in the acicular powder oriented in the magnetic layer of the tape to the longitudinal direction of the tape, magnetic tape having high squareness is obtained.

The improved magnetic recording medium of the present invention involves a technique of stabilizing conventional magnetic iron oxide powder containing the $Co^{2+}$ ions. Suitable forms of iron oxide used are $Fe_3O_4$-$\gamma Fe_2O_3$ solid solution, wherein the ratio of $Fe^{2+}/Fe^{3+}$ ranges from 0.10 to 0.35. The amount of cobalt present in the iron oxide composition ranges from 0.5 – 10 wt.%.

The magnetic stability of the iron cobalt magnetic oxide is improved by passing a magnetic recording medium having a magnetic recording layer (a substrate such as plastic film is coated with a magnetic paint containing iron cobalt oxide powder) of the indicated composition through the gap between a pair of magnets generating a maximum magnetic field more than 2000 Oe and then heating the magnetized recording layer to a temperature of 80° – 120°C. This is normally accomplished with hot air. After heating, the material is cooled to room temperature. At this point, the magnetized recording medium can be further treated by being stored at a temperature of room temperature to 60°C for at least one week.

Preferably, the magnetization treatment of the invention is accomplished such that the magnetic recording layer is magnetized so that a residual magnetization is retained which is at least 85% of the saturated magnetization. Further, the magnetic recording layer is then stabilized at a temperature of room temperature to 60°C.

The treatment process for the magnetic recording layer is characterized by the distinguishing feature that the half-value width of the differential curve of the residual magnetization curve of the treated magnetized magnetic recording layer is less than 60% of the half-value width of the differential curve of the residual magnetization curve of a non-treated (conventional) magnetic recording layer.

In the study of the equilibrium states of magnetic recording media it has been found that the magnetic tape treated in such manner as the procedure of instantaneously applying a magnetic field of more than 2000 Oe in the longitudinal direction of the magnetic tape is stabilized at a temperature from room temperatue to 60°C.

Having generally described this invention, a further understanding can be obtained by reference to certain specific examples which are provided herein for purposes of illustration only and are not intended to be limiting unless otherwise specified.

EXAMPLE 1

A magnetic paint having the following composition was prepared by using an acicular magnetic iron oxide powder containing 3.0 wt.% of a cobalt component and an $Fe^{2+}/Fe^{3+}$ ratio of 0.25. The length of the acicular magnetic powder was $0.5\mu$ and the ratio of the long axis to the short axis was 8.

| | | |
|---|---|---|
| Magnetic powder | 120 | parts by weight |
| Methylethyl ketone | 150 | " |
| Methylisobutyl ketone | 150 | " |
| Vinylchloride-vinylacetate copolymer | 30 | " |
| Polyurethane resin | 10 | " |
| Carbon black | 10 | " |
| Lubricant | 3 | " |

The magnetic paint was coated on a polyethyleneterephthalate film, and was subjected to a magnetic field orientation treatment, dried and then calendered. The coated film was magnetized by passing the film at a velocity of 20 m/min. through the gap having a width of 2.5 mm of a pair of strontium ferrite magnets. The magnets generated a maximum magnetic field of 3400 Oe in the longitudinal direction of the tape. The magnetized film was exposed to hot air at 80° – 120°C for 1 minute, cooled to room temperature and then cut to form magnetic tapes. The magnetic tapes were kept at 60°C for about two weeks until equilibrium states were attained. This process for stabilizing magnetic tapes by magnetizing the tapes and by keeping at a predetermined temperature is referred to as the magnetizing stabilization treatment which is very different from the conventional magnetic annealing treatment of tapes.

FIG. 2 shows the differential curve of the residual magnetization curve of magnetic tapes treated by the magnetizing stabilization treatment.

FIG. 3 shows the same curve of magnetic tapes which were not subjected to the magnetizing stabilization treatment.

Figure 5:
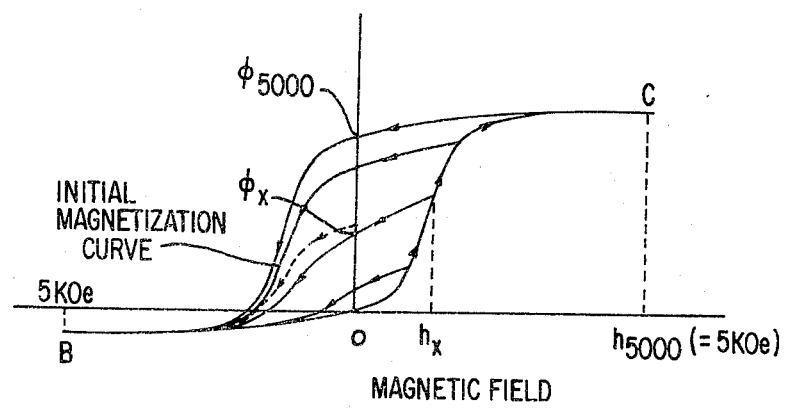
FIG. 5 shows the procedure for a measurements of the differential curve of a magnetic tape.

In the measurements the magnetic tapes were saturated ( B in FIG. 5) and then the magnetic field was reduced to zero. Subsequently, the magnetic field was gradually increased in the reverse direction. Then, several residual magnetized component ($\phi_x$ in FIG. 5)

at each magnetic field $h_x$ in FIG. 5) were measured until the tapes were saturated in the reverse direction (C in FIG. 5).

By this procedure the ratio of the each residual magnetized component ($\phi_x$ in FIG. 5) to the saturated magnetized component ($\phi_{5000}$ in FIG. 5) was measured, and the data obtained was plotted as a function of magnetic field. The curve obtained in this way is the residual magnetization curve. The differential curve is obtained to plot the differentiated value of the residual magnetization curve as a function of magnetic field.

A vibrating sample magnetometer was employed in the measurements. The central position of the differential curve corresponds to the normal coercive force.

When a series of residual magnetization measurements were taken on tapes in the time period embraced by the letter A in FIG. 1, the differential curves shown by the dotted line in FIGS. 2 and 3 were obtained. The time period A, of course, is the time period before the establishment of the equilibrium states.

When the tape characterized by the preequilibrium states is kept at room temperature for about one month, equilibrium states are finally obtained whereby a tape is obtained which has the differential curve shown by the full line in FIGS. 2 and 3. The time for reaching the equilibrium state can be shortened to 1 to 2 weeks by keeping the tape at 50° – 60°C after the magnetizing stabilization treatment.

As is clear from a comparison of FIG. 2 and FIG. 3, the effect of the magnetizing stabilization treatment appears as a sharp peak of the differential curve. The half-value width of this peak decreases to about 50% of that of the non-treated magnetic tape.

Such decrease means the increase of an uniaxial anisotropy of the tape. High tape sensitivity and high tape resolution are obtained by this increase of an uniaxial anisotropy.

EXAMPLE 2

A magnetic paint was prepared in accordance with the procedure of Example 1 except that using an acicular magnetic iron oxide powder having a cobalt component of 3.6 wt.% and an $Fe^{2+}/Fe^{3+}$ ratio of 0.23. The length of the particles was $0.5\mu$ and the ratio of the long axis to the short axis was 8. A magnetic tape was prepared in accordance with the procedure of Example 1 with the prepared magnetic paint. The magnetic tape was immediately passed through the gap between a pair of samarium-cobalt magnets which generates a magnetic field of 5000 Oe. Then the tape was kept at 60°C for about two weeks until equilibrium states were obtained.

Figure 4:
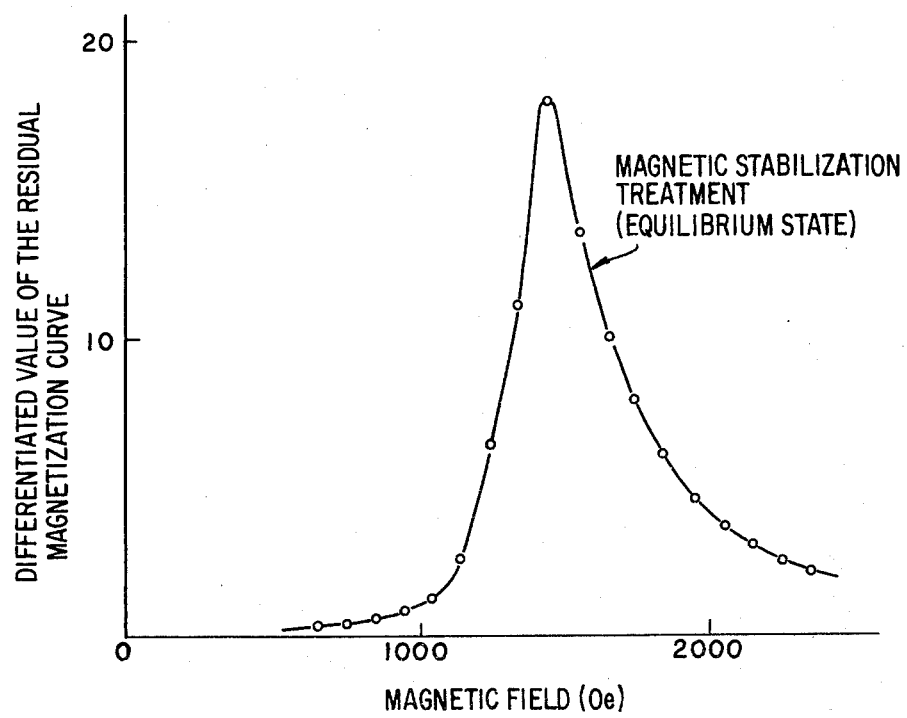
FIG. 4 shows the diffrential curve of the residual magnetization curve of a magnetic tape of another example of the invention.

The differential curve of the residual magnetization curve was measured in accordance with the procedure of Example 1 and the results are shown in FIG. 4. As is clear from FIG. 4, effect similar to those of Example 1 were achieved without any heat treatment. In order to achieve the effect by using only a magnetizing treatment without a heat treatment, the magnetizing treatment should be applied before equilibrium conditions are reached, i.e. in the time period embraced by A in FIG. 1. In Examples 1 and 2, the magnetizing treatment was performed with a pair of magnets after the preparation of the magnetic tapes. The important point is that the magnetic tapes should be magnetized so that a residual magnetization of more than 85% of the saturated residual magnetization remains in the longitudinal direction of the magnetic tapes. Thus, if it is possible to increase the orienting magnetic field in the coating process, then the orientation and the magnetizing treatment of the tape can occur simultaneously.

Magnetic paints having other compositions can also be used, and the magnetic powder are not limited to those of Examples. Other acicular magnetic iron oxide powder include those which have a cobalt component ranging from 0.5 – 10.0 wt.% and an $Fe^{2+}/Fe^{3+}$ ratio of 0.1 – 0.35. As indicated earlier, when the acicular magnetic iron-cobalt oxide powder which have a $Co^{2+}$ ion content of 0.5 – 10.0 wt.% and an $Fe^{2+}/Fe^{3+}$ ratio of 0.10 – 0.35 is instantaneously magnetized until saturated and then heat-treated or kept at room temperature to 60°C for 1 week to 1 month, the magnetic anisotropy induced in the magnetic substances can be effectively controlled. Other suitable magnetic recording media besides magnetic tapes include magnetic sheets; magnetic cards, magnetic drums and the like.

As is clear from FIG. 1, the full effects of the induced magnetic anisstropy are optimized at coercive forces of more than 1000 Oe. The method of this invention is especially effective for coercive forces greater than 1000 Oe. In accordance with the process of the invention, the problem of relaxation phenomenon which appears after magnetic annealing treatment can be solved by effective utilization of the acicular shape anisotropy and the single domain of the powder. The process of the present invention imparts a magnetic effect to iron-cobalt magnetic oxide particles which is similar to the effect obtained by the conventional magnetic annealing treatment whereby a continuous magnetic field is applied from high temperatures to room temperature. Thus the present process represents an improvement which has substantial economic and production significance.

Having now fully described this invention, it will be apparent to one of ordinary skill in the art that many changes and modifications can be made thereto without departing from the spirit or scope of the invention as set forth herein.

What is claimed is:
1. A magnetic recording tape, which comprises:
    a magnetic recording layer containing magnetic iron oxide having a cobalt content of 0.5 – 10 weight % and a ratio of $Fe^{+2}/Fe^{+3}$ of 0.1 – 0.35, which is magnetized to a residual magnetization of at least 85% of the saturated magnetization, and characterized by a width of the half peak height of the differential curve of the residual magnetization curve which is less than 60% of the width of the half peak height of the differential curve of a non-treated conventional iron-cobalt magnetic oxide magnetic recording layer, and further characterized by a slope of at least about 325 of the line in a graph obtained from a plot of the coercivity in oersteds (Hc) of said magnetic recording layer versus % cobalt content.

* * * * *